(12) United States Patent
Hara

(10) Patent No.: US 6,296,971 B1
(45) Date of Patent: Oct. 2, 2001

(54) NON-AQUEOUS ELECTROLYTE CELL

(75) Inventor: Tomitaro Hara, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/422,251

(22) Filed: Oct. 21, 1999

(30) Foreign Application Priority Data

Oct. 30, 1998 (JP) ................................................ 10-311480

(51) Int. Cl.$^7$ .................................................... H01M 2/00
(52) U.S. Cl. ........................ 429/163; 429/176; 429/185
(58) Field of Search ................................. 429/163, 176, 429/175, 185, 153, 127

(56) References Cited

U.S. PATENT DOCUMENTS

| | | | |
|---|---|---|---|
| 4,997,732 | * | 3/1991 | Austin et al. ........................ 429/153 |
| 5,888,672 | * | 3/1999 | Gustafson et al. .................. 429/314 |
| 6,114,068 | * | 9/2000 | Yamada et al. ...................... 429/300 |

FOREIGN PATENT DOCUMENTS

| | | |
|---|---|---|
| 0 390 557 A2 | 10/1990 | (EP) . |
| 0 834 934 A1 | 4/1998 | (EP) . |
| 0 862 227 A1 | 9/1998 | (EP) . |
| 0 938 145 A2 | 8/1999 | (EP) . |
| 59 180962 A | 10/1984 | (JP) . |

* cited by examiner

Primary Examiner—Gabrielle Brouillette
Assistant Examiner—Raymond Alejandro
(74) Attorney, Agent, or Firm—Bell, Boyd & Lloyd LLC

(57) ABSTRACT

A non-aqueous electrolyte cell having high hermetic sealing and hermetic sealing properties and which is reduced in thickness. A unit cell of the non-aqueous electrolyte cell is accommodated in a packaging material formed by a laminated film. The packaging material includes at least a metal layer and a heat fused layer arranged on an inner side of the meta layer. The heat fused layer is made up of a plurality of layers each containing the same monomeric unit. A mixed layer where plastic materials of the plural layers co-exist is formed between the plural layers such that the heat fused layer is in the form of a continuous film not having a definite boundary surface.

10 Claims, 2 Drawing Sheets

NON-AQUEOUS ELECTROLYTE CELL

RELATED APPLICATION DATA

The present application claims priority to Japanese Application No. P10-311480 filed Oct. 30, 1998 which application is incorporated herein by reference to the extent permitted by law.

BACKGROUND OF THE INVENTION

1. Field of the Invention

This invention relates to a non-aqueous electrolyte cell in which an unit cell is housed in an exterior packaging material comprised of a laminated film.

2. Description of the Related Art

Recently, the tendency is towards cordlessness and portability of an electronic equipment, primarily exemplified by a notebook type personal computer, and small-sized lightweight portable electronic equipments are being developed one after another. With increasing diversity of the electronic equipment, power consumption is increased, such that a demand for a high-capacity cell, as an energy source of the electronic equipment, in particular the secondary cell, is increasing.

Among the secondary cells, used up to now, there are a lead storage cell and a nickel/cadmium cell. As new secondary cells, nickel/hydrogen cell or lithium ion cell, are being actually used. These secondary cells, however, use a liquid as the electrolyte, and hence suffers the problem of liquid leakage from the cell.

For overcoming this problem, a polymer lithium ion secondary cell, employing a high molecular gel swollen by the electrolytic solution as the electrolyse, has been devised. With the development of the polymer lithium ion secondary cell, the problem of liquid leakage from the cell is eliminated to allow to realize a small-sized and lightweight thin-type secondary cell having a high energy density.

The structure of the polymer lithium ion secondary cell is now explained. On a positive electrode current collector, constituted by a thin aluminum sheet, an active material composed of, for example, $LiCoO_2$ and graphite, is layered to constitute an electrode. On a negative electrode current collector, constituted by a thin copper sheet, an active material composed of, for example, carbon, cokes or graphite, is layered, to constitute another electrode. In-between the electrodes, there is arranged a separator, as a thin porous film. In-between the electrodes and the separator, a high molecular gel-like electrolyte, such as polyacrylonitrile (PAN), polyethylene oxide (PEO) or polyvinylidene fluoride (PVDF) is charged to complete a unit cell of a sandwich structure.

The unit cell, having the sandwich structure, is encapsulated in an packaging material, as an packaging vessel, comprised of a metal thin film, such as an aluminum foil, and a plastic film of, for example, nylon, polyethylene, polypropylene or polyethylene terephthalate.

In general, this type of the cell is loaded in a small spacing of the electronic equipment where component parts are integrated to a high packing density, and hence an exterior packaging material exhibiting high flexibility to all sorts of stress is desirable. The present inventors have already developed a method for manufacturing a card type cell in which the unit cell is encapsulated by a highly flexible packaging material while the cell characteristics are maintained (Japanese Laying-Open Patent H-8-83596).

There is also disclosed in Japanese Laying-Open Patent H-8- 101356 a technique in which an insulating layer having superior barrier characteristics with respect to the electrolytic solution is interposed between a heat-sealing plastic layer as the innermost layer and a metal layer of the packaging pouch to improve the packaging properties for the electrolytic solution.

However, the more the number of layers of the layered structure of the exterior packaging material, as in the method described in the Japanese Laying-Open Patent H-8-101356, the lower tends to become the reliability in the hermetic sealing performance of the cell, due to, for example, gas intrusion from the bonding interface of respective layers or exfoliation of the interfacial bonding portions.

Since an adhesive layer with a thickness of a least 5 μm is required for bonding the respective layers, the entire layer thickness is increased, thus increasing the amount of the gas transmitted from the inner layer in its entirety.

It has, therefore, been desired to develop a thin cell packaging material exhibiting high hermetic sealing and bonding properties.

SUMMARY OF THE INVENTION

It is therefore an object of the present invention to provide a thin type cell packaging material exhibiting high hermetic sealing and bonding properties.

It is another object of the present invention to provide a non-aqueous electrolyte cell having high reliability and which can further be reduced in thickness.

According to the present invention, there is provided a non-aqueous electrolyte cell having high hermetic sealing and hermetic sealing properties and which is reduced in thickness, in which a unit cell is accommodated in a packaging material formed by a laminated film. The packaging material includes at least a metal layer and a heat fused layer arranged inwardly thereof, while the heat fused layer is made up of a plurality of layers each containing the same monomeric unit.

The packaging material of the present invention is of a multi-layered structure even although there is no adhesive layer inwardly of a metal foil portion. That is, the portion of the packaging material lying inwardly of the metal foil portion is a plastic material presenting a continuous layer structure. This continuous layer structure is composed of such materials having analogous molecular skeleton and which is able to be chemically bonded or mixed together, such as homopolymers or copolymers, thus forming a layered structure difficult to exfoliate by physical means. The materials of the layered structure are of respective different physical properties, such that superior hermetic sealing properties can be realized by combining a material having superior resistance against the electrolytic solution and a material having superior heat sealing properties.

DESCRIPTION OF THE PREFERRED EMBODIMENTS

Figure 1:
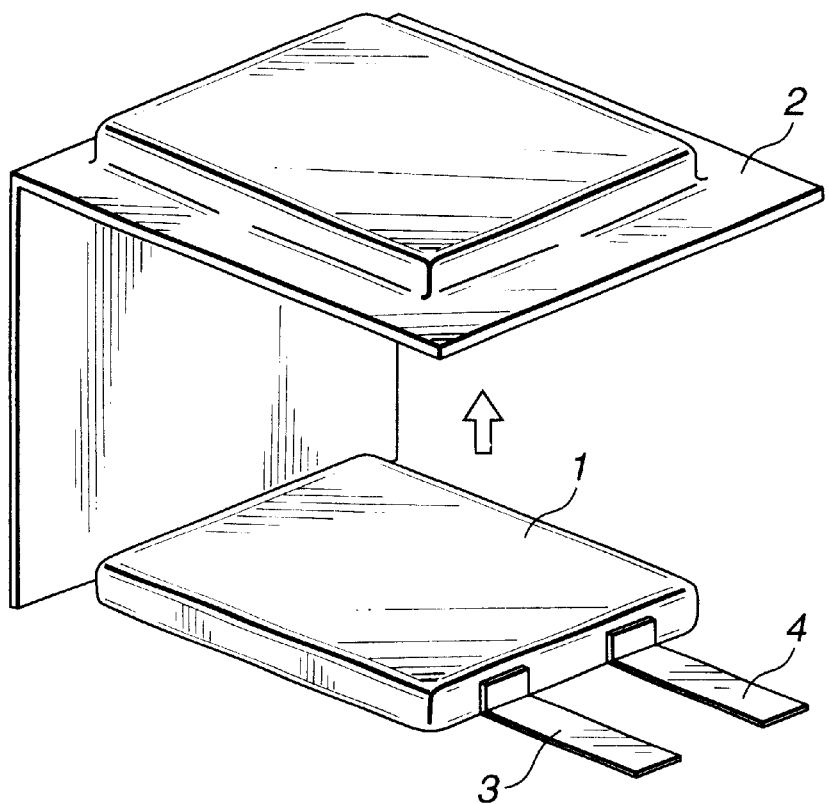
FIG. 1 is an exploded perspective view showing an illustrative structure of a solid electrolyte cell embodying the present invention.

Referring to the drawings, the structure of a non-aqueous electrolyte cell embodying the present invention is explained in detail.

Figure 2:
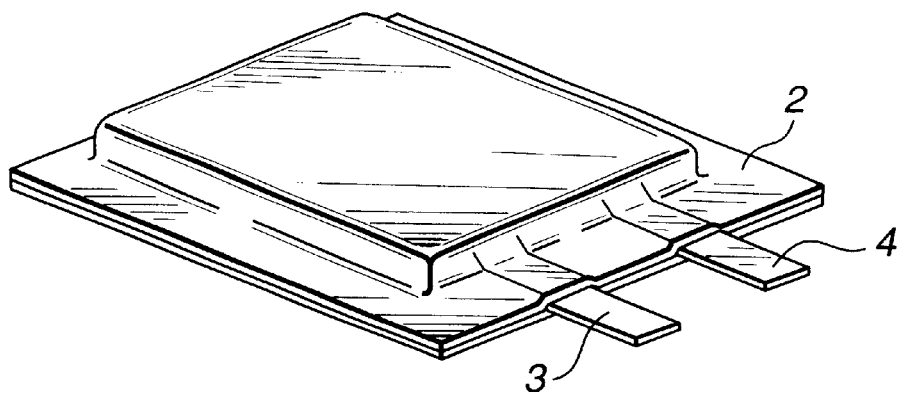
FIG. 2 is a schematic perspective view showing the illustrative structure of the solid electrolyte cell shown in FIG. 1.

The non-aqueous electrolyte cell of the present invention is a solid electrolyte or gel-like electrolyte cell and is comprised of a unit cell 1 encapsulated in a packaging material 2 of a laminated film, as shown in FIGS. 1 and 2. The unit cell 1 is comprised of the solid electrolyte or the gel-like electrolyte arranged between a layer of an active material for the positive terminal and a layer of an active material for the negative terminal. The unit cell 1 has its rim portion heat-sealed so as to be encapsulated in the packaging material 2.

The unit cell 1 is provided with a negative terminal lead 3, electrically connected to a negative electrode of the unit cell 1, and with a positive terminal lead 4, electrically connected to a positive electrode of the unit cell 1, these leads 3, 4 being led out from the packaging material 2.

Figure 3:
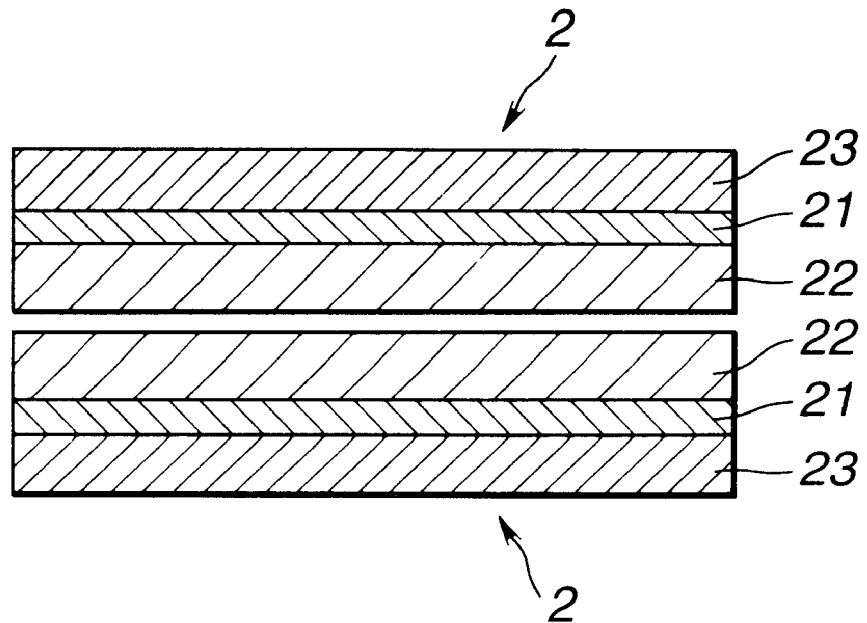
FIG. 3 is a cross-sectional view showing an illustrative structure of a packaging material.

The packaging material 2, used in the present invention, is comprised of plastic films 22, 23, bonded to a thin metal film 21, as shown for example in FIG. 3. The plastic film 22 of the innermost layer is used for encapsulation by heat fusion on packaging the unit cell 1, and corresponds to the heat-fused layer.

The plastic film 23 of the outermost layer, preferably formed of a plastic material, having superior strength, such as nylon or polyethylene terephthalate (PFT), is preferably not less than 30 μm in thickness, if it is formed of nylon. However, there is no particular limitation to the thickness provided that a sufficient strength of the packaging material is assured and corrosion of the metal foil portion is prohibited from occurring. The thin metal film 21, formed of a metallic material, having excellent resistance against gas transmittance, such as aluminum, is preferably not less than 25 μm in order to assure sufficient resistance against gas transmission.

The plastic film 22, constituting a layer lying inwardly of the thin metal film 21, is formed of a plastic material having the same monomeric unit in its skeleton structure. By having the same monomeric units in the skeleton structure, the respective plastic materials are increased in interfacial affinity to allow to constitute a continuous layer by a simplified processing, such as heat fusion, without the necessity of using an adhesive.

Specifically, the plastic layer 22 lying inwardly of the thin metal film 21 is to be comprised of at least one layer having superior resistance against gas transmission and at least one layer exhibiting superior fusion on heating, in order to maintain hermetic sealing properties of the cell. That is, the plastic layer 22 is preferably a multi-layered plastic material at least one layer of which is of such properties that, if the layer is 25 μm in thickness and placed for 24 hours at a temperature of 40° C. and a RH of 90%, the amount of steam transmitted therethrough is 10 $g/m^2$ or less and preferably 6 $g/m^2$ or less. Also, in the material of such at least one layer of the multi-layered plastic material, the dynamic viscoelasticity at a temperature within 5° C. from the melting point of the material is preferably 15% or less and more preferably 13% or less. If the dynamic viscoelasticity is lower than the above range, or exhibits the breaking behavior, it is poor in fusion to lower the reliability of the hermetic sealing properties of the cell. If the dynamic viscoelasticity is higher than the above range, the layered structure of the heat-fused portion tends to be destroyed.

Figure 4:
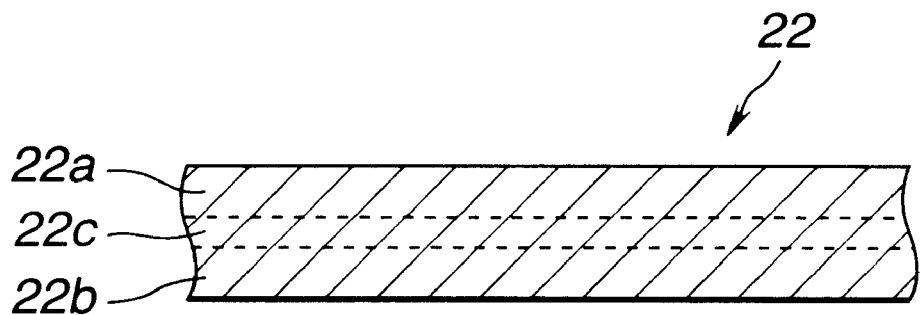
FIG. 4 is a schematic cross-sectional view showing an illustrative structure of a heat fused layer.

FIG. 4 schematically shows the structure of the plastic film 22. Between different layers 22a, 22b, there is a mixed layer 22c where the plastic materials of the layers 22a, 22b exist together, such that the plastic film 22 represents a continuous film exhibiting no clear boundaries.

The innermost layer 22a is formed of a material having the dynamic viscoelasticity not higher than 15% at a temperature within 5° C. as from the melting point as described above. The layer 22b on the opposite side is formed of a plastic material in which the amount of steam transmitted therethrough when a film of the material is placed for 24 hours in an environment of the temperature of 40° C. and a RH of 90% is not larger than 10 $g/m^2$.

The plastic material satisfying the above condition is preferably a plastic material having polypropylene as a main skeleton. The layer having superior resistance against gas transmission is of a polypropylene polymer based material having an average molecular weight of not less than 150,000 and preferably not less than 180,000. The layer having superior heat fusion properties is of a polypropylene copolymer based material. The copolymeric component of the copolymer is preferably polyethylene, with the relative amount of polyethylene to polypropylene being not less than 3 wt % and preferably not less than 5 wt %. With the polyethylene content higher than this range, problems are raised in connection with resistance against the electrolytic solution or strength in film molding. With the polyethylene content lower than this range, the dynamic viscoelasticity is not lowered sufficiently.

In case of the solid electrolyte cell or the gel-like electrolyte cell, the high molecular material used for the high-molecular solid electrolyte of the unit cell 1 may be enumerated by silicon gel, acrylic gel, acrylonitrile gel, polyphosphasen modified polymer, polyethylene oxide, polypropylene oxide, and compound, cross-linked or modified polymers thereof, fluorine-based polymers, such as poly (vinylidene fluoride), poly (vinylidene fluoride -co-hexafluoro propylene), poly(vinylidene fluoride -co- trifluoro ethylene), and mixtures thereof, only by way of examples.

The solid electrolyte or the gel-like electrolyte, layered on the layer of the active material for the positive electrode or on the active material for the negative electrode, is obtained on impregnating the layer of the active material for the positive electrode or the active material for the negative electrode with a solution composed of a high molecular compound, an electrolyte salt and a solvent (with a plasticizer in the case of the gel-like electrode), removing the solvent and solidifying the resulting mass. The solid electrolyte or the gel-like electrolyte, layered on the layer of the active material for the positive electrode or on the active material for the negative electrode, has its portion solidified by being impregnated in the active material for the positive electrode or the active material for the negative electrode. If the high molecular material of the cell element 2 is cross-linked, it is subsequently solidified on being cross-linked with light or heat.

The gel-like electrolyte is composed of a lithium salt containing plasticizer and not less than 2 wt % to 30 wt % or less of a matrix high molecular material. It is noted that esters, ethers or carbonic acid esters may be used alone or as an ingredient of the plasticizer.

As the matrix high molecular material, used for gelating these carbonic acid esters in preparing the gel-like electrolyte, a variety of high molecular materials used for constituting the gel-like electrolyte may be used. In view of reduction/oxidation stability, it is desirable to use a fluorine-based high molecular material, such as, for example, poly (vinylidene fluoride) or poly (vinylidene fluoride -co-hexafluoro propylene).

The high molecular solid electrolyte is composed of a lithium salt and a high molecular compound for dissolving the lithium salt. As the a high molecular compound, ether-based high molecular compounds, such as poly(ethylene oxide) or cross-linked compounds thereof, poly(methacrylate) esters, acrylates, or fluorine-based high molecular compounds, such as poly(vinylidene fluoride) or poly(vinylidene -co- hexafluoro propylene), may be used alone or as a mixture. In view of stability in oxidation/reduction, fluorine-based high molecular compounds, such as poly(vinylidene fluoride) or poly(vinylidene -co-hexafluoro propylene), may preferably be used.

As the lithium salts to be contained in the gel-like electrolyte or high-molecular solid electrolyte, those used in a routine cell electrolytic solution may be used. Only by way of examples, the lithium compounds (salts) may be enumerated by lithium chloride, lithium bromide, lithium iodide, lithium chlorate, lithium perchlorate, lithium bromate, lithium iodate, lithium nitrate, tetrafluoro lithium borate, hexafluoro lithium phosphate, lithium acetate, bis (trifluoromethane sulfonyl) imido lithium, $LiAsF_6$, $LiCF_3SO_3$, $LiC(SO_2CF_3)_3$, $LiAlCl_4$ and $LiSiF_6$.

These lithium compounds may be used alone or in combination. Of these, $LiPF_6$ and $LiBF_4$ are desirable in view of oxidation stability.

The concentration of lithium salts is 0.1 to 3.0 mol per liter and preferably 0.5 to 2.0 mol per liter of the plasticizer.

The cell element 2 of the non-aqueous electrolyte cell 1 according to an embodiment of the present invention may be constructed in the same way as in a conventional lithium ion cell except using the above-described gel-like electrolyte or solid electrolyte.

That is a, such a material that is able to dope/undope lithium can be used as a negative electrode material of a lithium ion cell. The constituent material for the negative electrode, such as a carbon material, for example, a difficultly graphizable carbonaceous material or graphite material, may be used. More specifically, carbon materials, including pyrocarbon, cokes (pitch cokes, needle cokes or petroleum cokes), graphite, vitreous carbons, sintered organic high molecular compounds (phenolic resins or furane resins, fired and carbonified at a moderate temperature), carbon fibers, and activated charcoal, may be used. Other materials that can dope/undope lithium include high molecular compounds, such as polyacetylene or polypyrrole, or oxides, such as $SnO_2$, may be used. In preparing a negative electrode, known types of binders may be added, if desired.

The positive electrode may be constructed, using high molecular compounds, such as metal oxides, metal sulfides or specified high molecular materials, as the active material for the positive electrode, depending on the type of the cell to be prepared. If, for example, a lithium ion cell is to be prepared, lithium-free metal sulfides or oxides, such as $TiS_2$, $MoS_2$, $NbSe_2$ or $V_2O_5$, or compound oxides of lithium, mainly composed of $LiMO_2$, where M denotes at least one of transition metals and x is usually 0.05 to 1.10 depending on the charging/discharging state of the cell, may be used as the active material for the positive electrode. The transition metal M of the compound oxide of lithium is preferably Co, Ni or Mn. Specified examples of the compound oxide of lithium include $LiCoO_2$, $LiNiO_2$, $LiNi_yCo_{1-y}O_2$, where $0<y<1$, or $LiMn_2O_4$. The compound oxide of lithium is able to develop a high voltage and serves as an active material for the positive electrode having a superior energy density. Plural sorts of the active material for the positive electrode may be used for the positive electrode. In preparing a positive electrode, known types of electrically conductive materials or binders may be added, if desired.

Examples of the structures of the unit cell 1 include a stacked type, in which the positive and negative electrodes are alternately stacked with the solid electrolyte in-between, a wound type in which the positive and negative electrodes are stacked with the solid electrolyte in-between and wound to form a wound assembly, and a collapsed type in which the positive and negative electrodes are stacked with the solid electrolyte in-between and collapsed alternately.

The present invention is applicable to the primary cell or to the secondary cell, as desired. However, utmost effects may be realized if the present invention is applied to the non-aqueous electrolyte secondary cell. Examples Specified Examples for carrying out the present invention and Comparative Examples are hereinafter explained on the basis of experimental results.

The unit cell used for evaluation is of a sandwich structure in which the positive electrode is lithium cobaltate and graphite, the negative electrode is graphite, the positive electrode current collector is an aluminum foil, the negative electrode current collector is a copper foil, and the solid electrolyte is polyvinylidene fluoride (PVDF), with the outer size and the capacity of the unit cell being 5 cm by 4 cm by 0.4 cm and 450 mAh, respectively.

Each unit cell 1 is packaged in each packaging material in such a manner that terminals can be derived to outside, with lateral sides of the unit cell being sealed at 210° C. and 3.5 kgf/cm$^2$, with a sealing width of 5 mm.

In the packaging material, the first layer, as a layer towards the metal foil, is of polypropylene homopolmyer (PP), with a number average molecular weight of 182,000 and a melting point of 180° C., and is stretched to a film having a thickness of 20 μm. The second layer, as a fused layer, is of polypropylene copolymer (CPP), with a number average molecular weight of 155,000 and a melting point of 143° C., with the polyethylene content of 4 wt %, and is stretched to a film having a thickness of 12 μm. These two films were pressure-bonded to each other, at 200° C. and 5.0 kgf/cm$^2$, to form a film having continuous layers, substantially free of the film-to-film interface (PP-CPP, with a thickness of 30 μm).

The molded PP-CPP film was stuck by an extruder to an aluminum (Al)film, 40 μm in thickness, to give a packaging material. In similar manner, a nylon film (Ny) with a thickness of 25 μm was stuck for use as a packaging material.

By a similar technique, the structure of the packaging material was varied as shown in Table 1 to prepare sample cells 1 to 5. In Table 1, LDPE and PET denote a low-density polyethylene and polyethylene terephthalate, respectively.

The sample cells, prepared as described above, were maintained for 500 hours in a constant temperature vessel at 70° C. and measurements were made of the amount aporized electrolyte ingredients and the amount of intruded moisture, while the state of exfoliation of the respective layers was checked. The results are shown in Table 1.

TABLE 1

| structure (thickness of respective layers in mm) | vaporized amounts of electrolyte ingredients (wt %) | amount of intruded moisture (ppm) | appearance |
| --- | --- | --- | --- |
| sample 1 Ny/Al(PP-CPP) (30/40/30) | 2.5 | 230 | no change |

TABLE 1-continued

| | structure (thickness of respective layers in mm) | vaporized amounts of electrolyte ingredients (wt %) | amount of intruded moisture (ppm) | appearance |
|---|---|---|---|---|
| sample 2 | PET/LDPF/Al/LDPF (12/20/30/50) | 75 | 1080 | A/LDPF interface exfoliated |
| sample 3 | PET/Al/Ny/LDPF (30/40/20/50) | 32 | 890 | A/LDPF interface partially exfoliated |
| sample 4 | Ny/Al/LDPF (30/40/25) | 71 | 940 | A/LDPF interface exfoliated |
| sample 5 | Ny/Al/PET/LDPF/PP (30/40/20/10/10 | 22 | 770 | LDPF/PP interface partially exfoliated |

In the sample cell 1 of the present invention, sufficient hermetic sealing is maintained, even if the thickness of the packaging material is reduced, such that the vaporized amount of electrolyte ingredients is extremely small, while interfacial exfoliation is not noticed.

What is claimed is:

1. A non-aqueous electrolyte cell in which a unit cell is accommodated in a packaging material formed by a laminated film, wherein said packaging material includes at least a metal layer and a heat fused layer arranged inwardly thereof;

said heat fused layer being made up of a plurality of layers each containing a same monomeric unit, wherein an innermost one of the plural layers of the heat fused layer is formed of a plastic material having a dynamic viscoelasticity within 5° C. from a melting point of the plastic material that is 15% or less.

2. The non-aqueous electrolyte cell according to claim 1 wherein a mixed layer where plastic materials of said plural layers co-exist is formed between said plural layers such that said heat fused layer is in the form of a continuous film.

3. The non-aqueous electrolyte cell according to claim 2 wherein said beat fused layer has a thickness of 20 to 40 $\mu$m.

4. The non-aqueous electrolyte cell according to claim 1 wherein said heat fused layer includes a layer of a plastic material such that, if a film 25 $\mu$m in thickness, formed of said plastic material, is placed for 24 hours in an environment of the temperature of 40 C. and a RH of 90%, the layer transmits steam in an amount of 10g/m$^2$ or less.

5. The non-aqueous electrolyte cell according to claim 1 wherein said layer is made up of a polypropylene or propylene copolymer containing propylene as a monomeric unit.

6. The non-aqueous electrolyte cell according to claim 5 wherein said propylene copolymer contains ethylene as a copolymer component.

7. The non-aqueous electrolyte cell according to claim 1 wherein the electrolyte of the unit cell is a gel electrolyte or a solid electrolyte containing lithium salts and a matrix high molecular weight polymer.

8. The non-aqueous electrolyte cell according to claim 1 wherein the negative electrode of the unit cell contains a material capable of doping/undoping lithium.

9. The non-aqueous electrolyte cell according to claim 8 wherein the material capable of doping/undoping lithium is a carbon material.

10. The non-aqueous electrolyte cell according to claim 1 wherein the positive electrode of the unit cell contains a compound oxide of lithium and a transition metal.

* * * * *